United States Patent
Maeda et al.

(10) Patent No.: US 10,014,980 B2
(45) Date of Patent: Jul. 3, 2018

(54) COMMUNICATION DEVICE AND COMMUNICATION SYSTEM

(71) Applicant: TOSHIBA MEMORY CORPORATION, Minato-ku (JP)

(72) Inventors: Kenichi Maeda, Kamakura (JP); Yujen Lai, Yokohama (JP); Yosuke Bando, Yokohama (JP); Hironori Uchikawa, Fujisawa (JP); Osamu Torii, Setagaya (JP)

(73) Assignee: TOSHIBA MEMORY CORPORATION, Minato-ku (JP)

( * ) Notice: Subject to any disclaimer, the term of this patent is extended or adjusted under 35 U.S.C. 154(b) by 128 days.

(21) Appl. No.: 15/258,527

(22) Filed: Sep. 7, 2016

(65) Prior Publication Data
US 2017/0257298 A1    Sep. 7, 2017

Related U.S. Application Data

(60) Provisional application No. 62/302,207, filed on Mar. 2, 2016.

(51) Int. Cl.
| | |
|---|---|
| *H04L 1/16* | (2006.01) |
| *H04L 12/26* | (2006.01) |
| *H04W 4/06* | (2009.01) |
| *H04W 28/04* | (2009.01) |
| *H04L 1/00* | (2006.01) |

(52) U.S. Cl.
CPC .......... *H04L 1/0075* (2013.01); *H04L 1/1657* (2013.01); *H04L 43/0829* (2013.01); *H04W 28/04* (2013.01); *H04W 4/06* (2013.01)

(58) Field of Classification Search
CPC ............... H04L 1/0001–1/248; H04L 2001/0092–2001/0098; H04L 2001/125; H04L 12/189–12/1895; H04L 41/0631–41/065; H04L 43/0823–43/0847; H04W 4/06; H04W 24/02–24/10; H04W 28/02–28/065; H04W 76/14; H04W 76/23
See application file for complete search history.

(56) References Cited

U.S. PATENT DOCUMENTS

| | | |
|---|---|---|
| 6,516,435 B1 | 2/2003 | Tsunoda |
| 6,675,346 B2 | 1/2004 | Tsunoda |
| 7,318,187 B2 | 1/2008 | Vayanos et al. |

(Continued)

FOREIGN PATENT DOCUMENTS

| | | |
|---|---|---|
| JP | 3571918 | 9/2004 |
| JP | 4113743 | 7/2008 |

(Continued)

*Primary Examiner* — Timothy J Weidner
(74) *Attorney, Agent, or Firm* — Oblon, McClelland, Maier & Neustadt, L.L.P.

(57) ABSTRACT

According to one embodiment, a communication device 1 operating as a publisher calculates parity of a certain size which is capable of being commonly used for each of different data units from data to be sent each time receiving a lost notification from one or more communication device 1 operating as subscribers, the lost notification indicating that one or more data units are lost, and sends the calculated parity to the one or more communication devices 1 operating as the subscribers.

19 Claims, 8 Drawing Sheets

(56) References Cited

U.S. PATENT DOCUMENTS

| | | | | |
|---|---|---|---|---|
| 2003/0128681 A1* | 7/2003 | Rauschmayer | ....... | H04L 1/1628 370/338 |
| 2005/0204242 A1* | 9/2005 | Chou | .................... | H04L 1/0017 714/741 |
| 2010/0058147 A1* | 3/2010 | Seferoglu | ............. | H04L 1/0009 714/776 |
| 2015/0071155 A1 | 3/2015 | Miyamoto et al. | | |

FOREIGN PATENT DOCUMENTS

| JP | 4833844 | 12/2011 |
|---|---|---|
| JP | 5370184 | 12/2013 |
| JP | 2015-56691 | 3/2015 |

\* cited by examiner

COMMUNICATION DEVICE AND COMMUNICATION SYSTEM

CROSS-REFERENCE TO RELATED APPLICATIONS

This application is based upon and claims the benefit of priority from U.S. Provisional Application No. 62/302,207, filed on Mar. 2, 2016; the entire contents of which are incorporated herein by reference.

FIELD

Embodiments described herein relate generally to a communication device and a communication system.

BACKGROUND

Recently, wireless P2P (peer-to-peer) technology in which a plurality of wireless terminals establishes direct connection without intervention of a relay to build a meshed network attracts attention. In the wireless P2P technology, when data is sent from a certain wireless terminal to one or more other wireless terminals, the wireless terminal having a message to be sent serves as a publisher and one or more wireless terminals which receive the data serve as subscribers, then the message to be sent is sent from the publisher to the subscriber by unicast or multicast.

DETAILED DESCRIPTION

A communication system according to an embodiment illustrated hereinafter is provided with a communication device operating as a publisher and a communication device operating as a subscriber. The communication device operating as the publisher comprises a first communication interface that sends/receives data to/from a subscriber, a unit creator that creates a plurality of data units, each of the plurality of data units including user data of a certain size, a first sender that sends the plurality of data units to the subscriber through the first communication interface, and a parity calculator that calculates parity which is capable of being commonly used for different data units out of the plurality of data units, the first sender sending the plurality of data units to the subscriber through the first communication interface, the parity calculator calculating the parity of the certain size based on the data to be sent every time receiving a lost notification from the subscriber, the lost notification indicating that one or more data units out of the plurality of data units are lost, the unit creator creating a parity unit including the parity calculated by the parity calculator, and the first sender sending the parity unit to the subscriber through the first communication interface. The communication device operating as the subscriber comprises a second communication interface that sends/receives the data to/from the publisher, a lost unit detector that detects loss of every one of the plurality of data units received from the publisher through the second communication interface, a lost notification creator that creates the lost notification indicating that the one or more data units are lost when the lost unit detector detects the loss of the one or more data units out of the plurality of data units, a second sender that sends the lost notification created by the lost notification creator to the publisher through the second communication interface, and a lost unit recovery executor that recovers the one or more lost data units detected by the lost unit detector by using the parity included in the parity unit received from the publisher according to the lost notification.

The communication device and the communication system according to the embodiment are hereinafter described in detail with reference to the attached drawings. Meanwhile, the present invention is not limited by the following embodiment.

Figure 1:
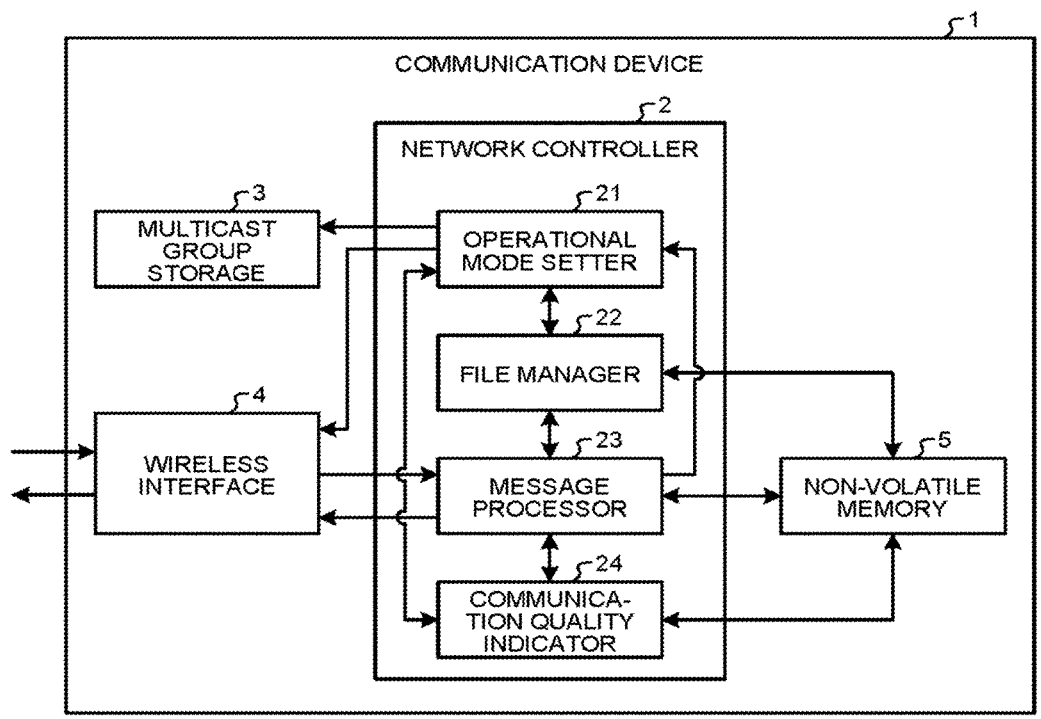
FIG. 1 is a block diagram illustrating a schematic configuration example of a communication device according to an embodiment.

FIG. 1 is a block diagram illustrating a schematic configuration example of the communication device according to an embodiment. As illustrated in FIG. 1, a communication device 1 is provided with a network controller 2, a multicast group storage 3 (identification information storage), a wireless interface 4 (communication interface), and a non-volatile memory 5.

The communication device 1 of the embodiment may send/receive a message to/from another communication device 1 having a similar configuration via P2P (peer-to-peer) communication. The communication device 1 may perform unicast communication with another communication device 1 and may send the same message to a plurality of other communication devices 1 by multicast.

The wireless interface 4 performs a reception process of a wireless signal, and when the received signal is the message to the device itself, this outputs the message to the network controller 2. The wireless interface 4 sends the message created by the network controller 2 as the wireless signal. Furthermore, the wireless interface 4 performs a transfer process for realizing the P2P communication by a plurality of communication devices 1.

In the embodiment, there is no restriction on a protocol and the like for realizing the P2P communication; an IP (internet protocol) may be used, for example. The wireless interface 4 adaptive to a plurality of frequency bands, that is to say, a plurality of frequency channels performs sending/receiving operation by switching between the frequency channels according to a command from an operation mode setter 21. Hereinafter, the frequency channel is simply abbreviated as a channel. Such wireless interface 4 may have a configuration provided with one wireless device adaptive to a plurality of channels or a configuration to appropriately switch between a plurality of wireless devices adaptive to different channels to use.

In a configuration in which the publisher sends the message by multicast, the multicast group storage 3 holds a list of identifiers of multicast groups to which the device itself belongs. The multicast group storage 3 notifies the wireless interface 4 of the identifier of the multicast group to which the device itself belongs. In respond to this, the wireless interface 4 determines that the message in which a multicast address corresponding to the identifier of the multicast group to which the device itself belongs is stored as a destination is also directed to the device itself.

The non-volatile memory 5 holds the data to be sent (to be delivered), the data included in the received message and the like.

The network controller 2 is provided with the operation mode setter 21, a file manager 22, a message processor 23, and a communication quality indicator 24.

The operation mode setter 21 (operation mode storage) stores whether the device itself is in a mode of operating as a wireless base station (wireless base station mode) or a mode of operating as a terminal (terminal mode). The terminal may also serve as the wireless base station and the wireless base station may also serve as the terminal in the embodiment.

In the configuration in which the publisher sends the message by multicast, the operation mode setter 21 also sets the multicast group to which the device itself belongs. When the wireless base station sends the message by multicast as the publisher, the operation mode setter 21 also stores whether the device itself is in a mode as the publisher or a mode as the subscriber. Meanwhile, in the configuration in which the publisher delivers the message to the subscriber by multicast, the configuration in which the publisher operates as the wireless base station and the subscriber operates as the terminal is common; however, the publisher may also operate as the terminal and the subscriber may also operate as the wireless base station.

The operation mode setter 21 also manages a switching process from the terminal mode to the wireless base station mode and the switching process from the wireless base station mode to the terminal mode. When the communication device 1 delivers the message by multicast as the publisher, the operation mode may be individually set for each multicast group. In this case, it is also possible to set such that one communication device 1 serves as the publisher in a certain multicast group and serves as the subscriber in another multicast group, for example. The operation mode setter 21 controls the file manager 22 and the message processor 23 so as to perform the operation according to the operation mode for each multicast group.

The message processor 23 creates the message obtained by formatting the data to be sent to another communication device 1 according to a certain format and inputs the created message to the wireless interface 4. The message processor 23 performs a process according to a content of the message on the message received from another communication device 1 through the wireless interface 4. The message processor 23 stores the data extracted from the message in the non-volatile memory 5 when the received message is a data message in which certain data is stored.

In the configuration in which the publisher delivers the message to the subscriber by multicast, the file manager 22 determines whether this possesses all the data (also referred to as files) listed in ToC (table of contents) information (contents information) based on the ToC information given by the publisher by means of a notification signal and determines whether all the data are received based on a determination result. Meanwhile, the notification signal may be information including a source publisher identifier for uniquely identifying the publisher serving as a source, a destination multicast group identifier for uniquely identifying the multicast group serving as a destination, and the ToC information including a list of the data which might be delivered from the publisher.

As for a condition of determining that all the data are received, a method based on the result of determining whether all the data to be sent are possessed by using the above-described ToC information is considered to be effective in the configuration in which the publisher delivers the message to the subscriber by multicast. However, the method is not limited thereto; it is also possible to determine that all the data are received by using a certain number of times of reception as a trigger or determine that all the data are received by using time elapsed after the reception is started as the trigger. It is also possible to determine that all the data are received by using reception of control data notifying that all the data are received as the trigger.

The communication quality indicator 24 obtains communication quality with the wireless base station based on a signal received from the connected wireless base station. As the communication quality, any index such as RSSI (received signal strength indication), received power of the wireless signal, a signal to noise power ratio, a communication quality indicator, and a packet error rate may be used.

Figure 2:
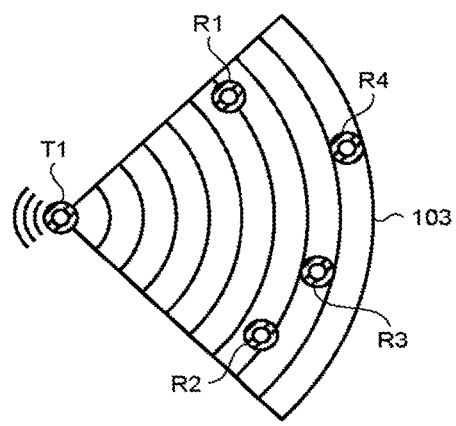
FIG. 2 is a view illustrating an example of multicast-delivery of the embodiment.

FIG. 2 is a view for illustrating an example of operation when the message is multicast-delivered in the communication system formed of the communication devices according to the embodiment. In the example illustrated in FIG. 2, a publisher (communication device 1 operating as a sending device) T1 sends the data message in which certain data is stored by multicast. Subscribers (communication devices 1 operating as receiving devices) R1 to R4 located within a reaching range 103 of a radio wave from the publisher T1 may receive the data message. Meanwhile, the radio wave output from each of the publisher T1 and the subscribers R1 to R4 may be with or without directivity. When the radio wave does not have the directivity, in FIG. 2, the radio waves output from the publisher T1 and the subscribers R1 to R4 concentrically propagate in a free space.

In a mesh network established by a plurality of communication devices 1 having the above-described configuration, it is considered to use automatic repeat request (ARQ) as a method of realizing highly reliable data communication between the communication device 1 serving as the publisher and one or more communication devices 1 serving as the subscribers. There are types of ARQ protocols such as Stop-and-wait ARQ, Go-Back-N ARQ, and Selective Repeat ARQ. However, in every protocol, it is required to resend the data which is not correctly received by a reception side and lost (hereinafter, referred to as lost data) from the publisher to the subscriber. Therefore, in a situation in which a communication environment is not excellent, a data amount processed by the publisher and the subscriber problematically increases or network traffic problematically increases. Especially, when different data are lost in a plurality of subscribers, the publisher must resend many data and a load on the publisher and the network tends to be larger.

As a method of preventing such an increase in the load, it is considered to decrease the number of times of resending by using error-correcting technology using a Reed-Solomon code, a tornado code, a raptor code and the like. However, in error correction using the Reed-Solomon code, for example, it is required to learn in advance a maximum value of the data lost in the multicast-delivery. Therefore, this is not adequate in a case in which a communication situation significantly changes according to an environmental cause such as a place such as in wireless P2P. Since it is required to handle all the data up to the maximum value also when the number of lost data is smaller than the maximum value supposed in advance, an entire load tends to increase. In contrast, in the error correction using the tornado code, the raptor code and the like, simple calculation of exclusive OR (XOR) is sufficient, so that this has an advantage that the load on the publisher and the subscriber may be decreased; however, this has a problem that there is no guarantee of recovering all the lost data by the parities as many as the lost data.

Therefore, in the following description, the communication device and the communication system capable of achieving the highly reliable data communication in the mesh network without increasing the load on the publisher, the subscriber, and the network are described with an example.

Figure 3:
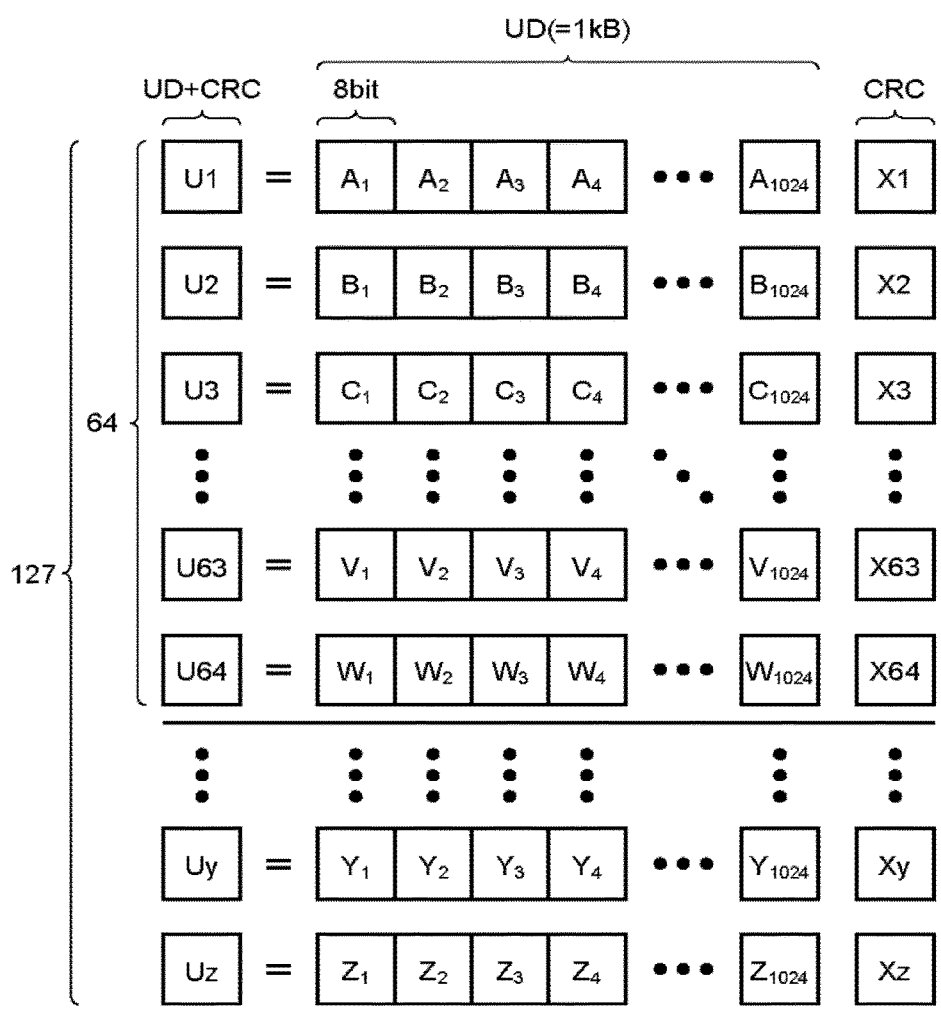
FIG. 3 is a schematic diagram illustrating a configuration example of data sent from a publisher to a subscriber in the embodiment.

FIG. 3 is a schematic diagram illustrating a configuration example of the data sent from the publisher to the subscriber (hereinafter, referred to as sent data) in the embodiment. As illustrated in FIG. 3, the sent data is formed of z (z is an integer not smaller than one) units (hereinafter, referred to as data units) U1 to Uz, for example. Each of the data units U1 to Uz is a unit of sending from the publisher T1 to the subscribers R1 to R4. Therefore, each packet sent from the publisher T1 to the subscribers R1 to R4 includes one of the data units U1 to Uz. The publisher T1 sequentially multicast-delivers the packets to the subscribers R1 to R4, thereby sending the data units U1 to Uz to each of the subscribers R1 to R4 in sequence.

One data unit has a structure obtained by concatenating 1 kB (kilobyte) user data UD with a CRC (cyclic redundancy check) code calculated from the user data UD, for example. Therefore, each of the subscribers R1 to R4 which receives the packet from the publisher T1 detects whether each packet is lost by using the CRC code included in the received data unit, for example. However, the method is not limited to the method of detecting a lost packet by using the CRC code; it is also possible to detect whether there is the lost packet by using a sequence number (hereinafter, referred to as unit number) assigned to each data unit or detect whether there is the lost packet by using the CRC code and the unit number together.

Each of the subscribers R1 to R4 discards the data unit included in the packet determined to be the lost packet and executes a process of recovering the data unit lost by the discard (hereinafter, referred to as a lost unit). The recovery process of the lost unit is executed on a block formed of a certain number of (64 in this description, for example) continuous data units as a unit, for example, that is to say, in block units. However, an arithmetic unit in the recovery process is a unit obtained by dividing the user data UD in each data unit by eight bits, for example. That is to say, the recovery process is executed for each of unit data $A_1$ to $W_{1024}$ in FIG. 3 as the arithmetic unit. Meanwhile, the arithmetic unit is not limited to eight bits; this may be appropriately changed to four bits, 16 bits and the like.

Following polynomial equation (1) expresses the user data UD included in the data units of one block. Meanwhile, the following description focuses on the block formed of the data units U1 to U64 for simplification.

$$f_1(x) = A_1 x^{63} + B_1 x^{62} + C_1 x^{61} + \cdots + V_1 x + W_1 \quad (1)$$
$$f_2(x) = A_2 x^{63} + B_2 x^{62} + C_2 x^{61} + \cdots + V_2 x + W_2$$
$$\cdots$$
$$f_{1024}(x) = A_{1024} x^{63} + B_{1024} x^{62} + C_{1024} x^{61} + \cdots + V_{1024} x + W_{1024}$$

Herein, suppose that one data unit is lost, the lost unit may be recovered by using the parity created by using following equation (2). Suppose that an e-th data unit Ue is lost, for example, the lost unit Ue may be recovered by using parity $P_{1,1}$ to $P_{1,1024}$ calculated by following equation (2). Meanwhile, 'i' is an integer taking a value from one up to the number of unit data (1024 in this description) forming the user data included in each data unit and '%' represents modulo operation. As for relationship between a and x, x is one element of a Galois field of $\{0, a^0, a^1, a^2, \ldots, a^{m-2}\}$ in which a is an element, wherein $m=2^l$ and $a^{m-1}=1$. In this description, 'l' takes any integer value from 0 to 63. This 'l' may be simply '0', for example.

$$P_{1,i} = f_i(x) \% (x - a^l) = f_i(a^l) \quad (2)$$

A unit created by concatenating the parity $P_{1,1}$ to $P_{1,1024}$ created by using equation (2) with the CRC code calculated from the parity $P_{1,1}$ to $P_{1,1024}$ is referred to as a parity unit P1 in this description. The parity unit P1 is not dependent on 'e' as is understood from equation (2) described above. This indicates that the parity unit P1 may be used for any lost unit regardless of which data unit is lost.

When two data units are lost, it is possible to recover the two lost data units by using a parity unit P2 created from parity $P_{2,1}$ to $P_{2,1024}$ created by using following equation (3) in addition to the parity unit P1 created by using equation (2) described above.

$$P_{2,i} = f_i(x) \% (x - a^{l+1}) = f_i(a^{l+1}) \quad (3)$$

Thereafter, when three or more data units are lost, it is possible to recover all the lost data units by executing the recovery process by using the parity units as many as the lost units created in the similar method.

Subsequently, an operational example of the recovery process of recovering the lost unit by using the parity unit created in the above-described manner is described. It is possible to specify which data unit in one block being a recovery processing unit the lost unit is by a loss detection process by using the CRC code and the unit number described above. Suppose that one data unit is lost and the lost unit is the e-th data unit Ue, for example, the user data included in the block, that is to say, user data $g_i(x)$ which is not lost may be expressed by following polynomial equation (4).

$$g_i(x) = A_i x^{63} + B_i x^{62} + C_i x^{61} + \ldots + V_i x + W_i - E_i x^{64-e} \quad (4)$$

It is possible to calculate the lost user data as in following equation (5) by subtracting the user data $g_i(x)$ provided by equation (4) from the parity $P_{1,1}$ to $P_{1,1024}$ created by using equation (2) described above. That is to say, it is possible to recover the lost data unit Ue by calculating following equation (5).

$$f_i(a^l) - g_i(a^l) = E_i(a^l)^e \quad (5)$$

Suppose that two data units are lost, for example, and the lost units are the e-th and f-th data units Ue and Uf, the user data UD included in the block may be expressed by following polynomial equation (6).

$$g_i(x) = A_i x^{63} + B_i x^{62} + C_i x^{61} + \ldots + V_i x + W_i - E_i x^{64-e} - F_i x^{64-f} \quad (6)$$

Therefore, it is possible to recover the two lost data units Ue and Uf by solving following simultaneous equation (7) to subtract the user data $g_i(x)$ provided by equation (6) from the parity $P_{1,1}$ to $P_{1,1024}$ and the parity $P_{2,1}$ to $P_{2,1024}$ created by using equations (2) and (3) described above, respectively.

$$f_i(a^l) - g_i(a^l) = E_i(a^l)^{64-e} + F_i(a^l)^{64-f}$$

$$f_i(a^{l+1}) - g_i(a^{l+1}) = E_i(a^{l+1})^{64-e} + F_i(a^{l+1})^{64-f} \quad (7)$$

Hereinafter, when three or more data units are lost, it is possible to recover all the lost data units by subtracting the user data which is not lost from each of the parities as many as the lost units created in the similar method.

Meanwhile, a structure of each parity unit may be similar to that of the data unit. That is to say, one parity unit has a structure obtained by concatenating 1 kB (kilobyte) parity $P_{1,1}$ to $P_{1,1024}$ with the CRC code calculated from the parity $P_{i,1}$ to $P_{i,1024}$, for example.

Subsequently, operation after the publisher T1 sequentially multicast-delivers the data units until each of the subscribers R1 to R4 recovers the lost unit is described in detail with reference to the drawings. Meanwhile, in the following description, a case in which four data units U1 to U4 are created from the data to be sent and one block is formed of the four data units U1 to U4 is illustrated for simplification. In the mesh network formed of the publisher T1 and the four subscribers R1 to R4, priority for the publisher T1 is set in order from the subscriber R1 to the subscriber R4 based on the situation of the communication environment and the priority is shared among the publisher T1 and the subscribers R1 to R4. The priority set by any communication device 1 (for example, communication device 1 operating as the publisher T1) based on the index measured by the communication quality indicator 24 in each communication device 1 may be shared among the communication devices 1 forming the mesh network.

Figure 4:
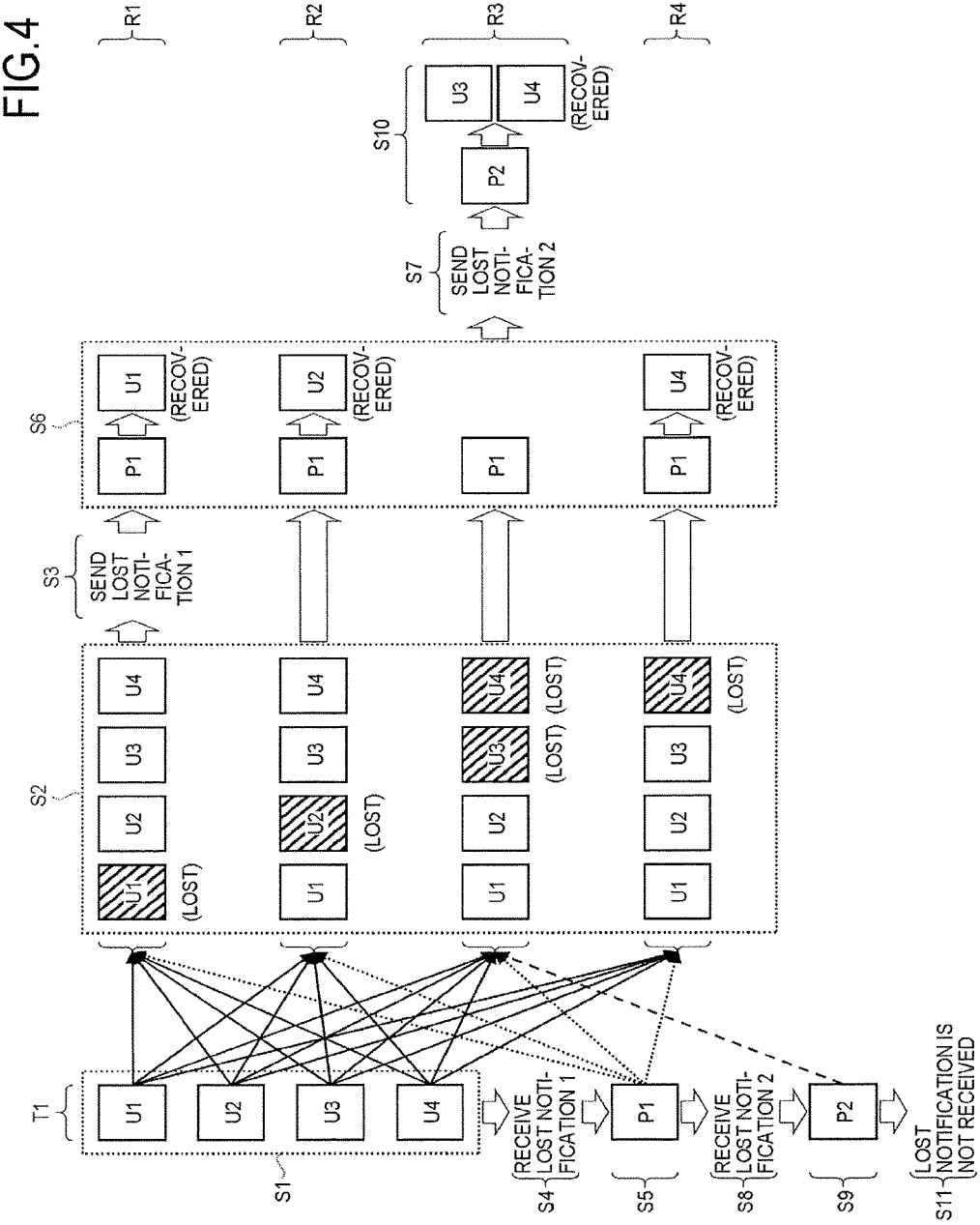
FIG. 4 is a schematic diagram for illustrating an operational example when a data unit is lost in the embodiment.

FIG. 4 is a schematic diagram for illustrating an operational example after the publisher sequentially multicast-delivers the data units until each subscriber recovers the lost unit in the embodiment. As illustrated in FIG. 4, the publisher T1 sequentially multicast-delivers the data units U1 to U4 to the destination multicast group (step S1). In response to this, each of the subscribers R1 to R4 included in the destination multicast group sequentially receives the delivered data units U1 to U4 (step S2). At that time, each of the subscribers R1 to R4 determines whether there is the lost unit in the received data units U1 to U4, and if necessary, determines which data unit is lost by using the CRC codes included in the received data units U1 to U4 and/or the unit numbers.

When there is the lost unit in the received data units U1 to U4, the subscriber with the highest priority out of the subscribers R1 to R4 in which there is the lost unit sends a notification that the data unit is lost (lost notification 1) to the publisher T1 (step S3). In the example illustrated in FIG. 4, there is one lost unit in the subscribers R1, R2, and R4 and there are two lost units in the subscriber R3, and the priority is set in order from the subscriber R1 to the subscriber R4, so that the first lost notification 1 is sent from the subscriber R1 to the publisher T1 (steps S3 to S4).

When receiving the lost notification 1 (step S4), the publisher T1 creates the first parity unit P1 by the method described above and multicast-delivers the same to the destination multicast group (step S5). In response to this, the subscribers R1, R2, and R4 in which there is the lost unit receives the sent first parity unit P1 and recovers the data unit lost in the devices themselves by using the received parity unit P1 (step S6). According to this, in the example illustrated in FIG. 4, the data unit U1 is recovered in the subscriber R1, the data unit U2 is recovered in the subscriber R2, and the data unit U4 is recovered in the subscriber R4. Since two data units are lost in the subscriber R3, this cannot recover the lost units at that time.

Next, when there is the subscriber in which the lost unit not yet recovered remains, the subscriber with the highest priority out of the subscribers in which the lost unit not yet recovered remains sends a lost notification 2 to the publisher T1 (step S7). In the example illustrated in FIG. 4, the subscriber R3 includes the lost units U3 and U4 not yet recovered, so that the subscriber R3 sends the second lost notification 2 to the publisher T1. In response to this, when receiving the lost notification 2 (step S8), the publisher T1 creates the second parity unit P2 this time and multicast-delivers the same to the destination multicast group (step S9). In response to this, the subscriber R3 receives the sent second parity unit P2 and recovers the data units U3 and U4 lost in the device itself by using the received parity unit P2 together with the already received P1 (step S10). Hereinafter, the similar operation is repeated until the lost notification is no longer sent from all the subscribers R1 to R4 (step S11), then all the lost units are recovered in all the subscribers R1 to R4.

Figure 5:
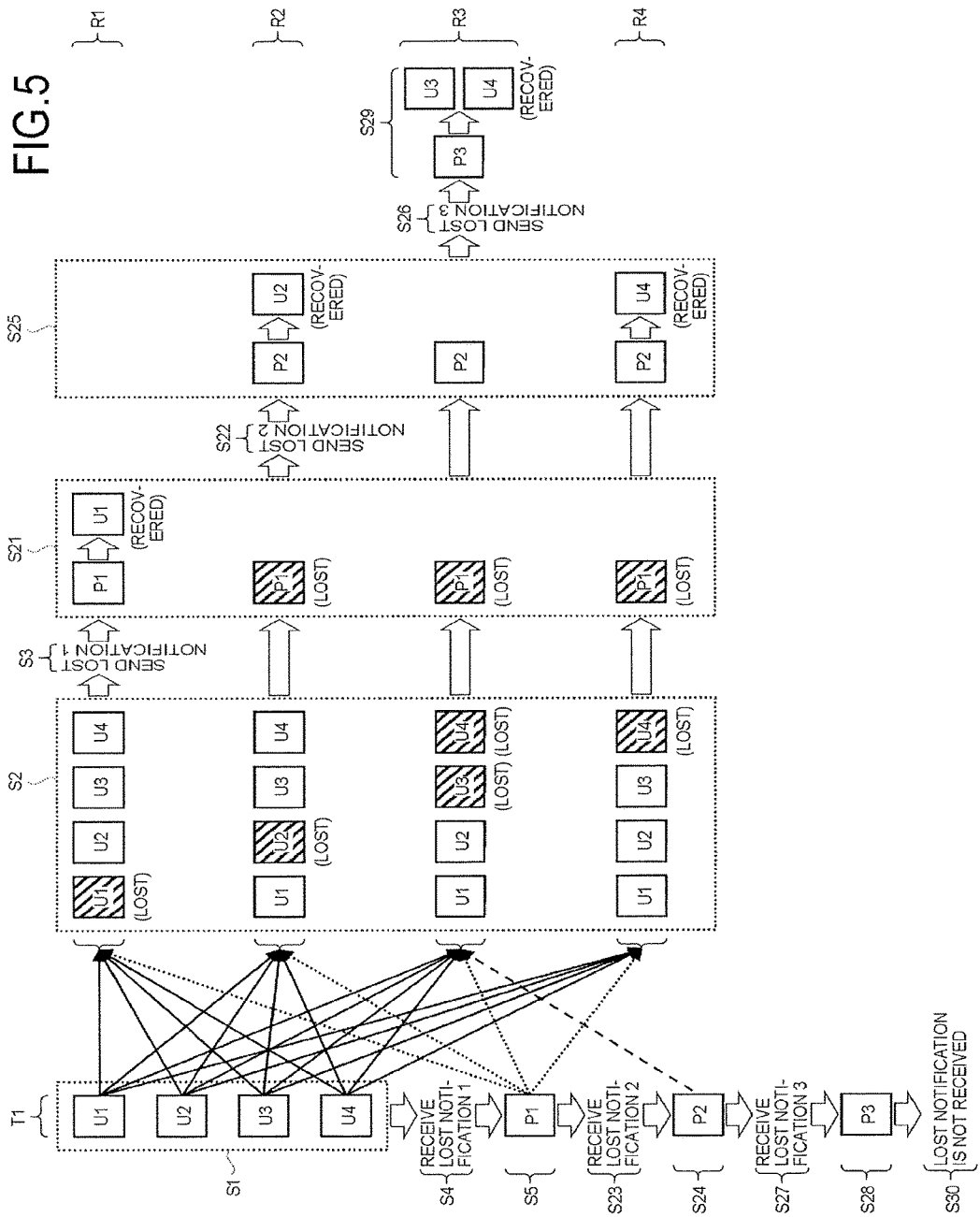
FIG. 5 is a schematic diagram for illustrating an operational example when a parity unit is lost in the embodiment.

There also is a case in which not only the data unit but also the parity unit is lost. An operational example in such a case is illustrated in FIG. 5. Meanwhile, a case in which the parity unit P1 received by each of the subscribers R2 to R4 is lost as a result of executing steps S1 to S5 in the operation illustrated in FIG. 4 is illustrated in FIG. 5.

As illustrated in FIG. 5, when the parity unit P1 is lost in each of the subscribers R2 to R4 as a result of checking the parity unit P1 multicast-delivered from the publisher T1 at step S5 by each of the subscribers R1 to R4 by using the CRC code, (step S21), the subscriber R2 with the highest priority out of the subscribers R2 to R4 sends the second lost notification 2 to the publisher T1 (step S22).

When receiving the lost notification 2 (step S23), the publisher T1 creates the second parity unit P2 by the method described above and multicast-delivers the same to the destination multicast group (step S24). In response to this, the subscribers R2 and R4 in which there is the lost unit receives the sent second parity unit P2 and recovers the first data unit lost in the devices themselves by using the received parity unit P2 (step S25).

Thereafter, the subscriber R3 in which the lost unit not yet recovered remains sends a third lost notification 3 to the publisher T1 (steps S26 to S27), and in response to this, the publisher T1 creates a third parity unit P3 and multicast-delivers the same to the destination multicast group (step S28). According to this, the data units U3 and U4 are recovered by using the third parity unit P3 together with the already received P2 in the subscriber R3 (step S29). As a result, all the lost units in all the subscribers R1 to R4 are recovered. Thereafter, since the lost notification is not sent from the subscribers R1 to R4 to the publisher T1 (step S30), the publisher T1 determines that all the data to be sent are received by the subscribers R1 to R4 and finishes this operation.

When there is a plurality of lost units in one communication device 1, a plurality of parities used for recovering a plurality of lost units must be linearly independent from each other. Meanwhile, linear independency may be linear independency in general meaning (also referred to as primary independency); when all solutions of arbitrary constants Ci when a sum of terms obtained by multiplying each parity Pi by an arbitrary constant Ci is 0 are no other than 0, the parities are linearly independent from each other.

One of conditions of guaranteeing that a plurality of parities is linearly independent from each other is that a plurality of parities is continuous parities. When there are two lost units, there is another condition that the number of data units included in one block is expressed by $((2^n-1)+1)/2=2^{(n-1)}$ (n is an integer not smaller than one) using a Mersenne prime. Hereinafter, a case in which the condition is that a plurality of parities is the continuous parities is described.

Suppose that two data units are lost and the lost units are the e-th and f-th data units Ue and Uf, for example, the user data included in the block is expressed by polynomial equation (6) described above.

Herein, suppose that the first to fifth parity units P1 to P5 are sent from the publisher for recovering the lost e-th and f-th data units Ue and Uf, and the first, third, and fourth parity units P1, P3, and P4 out of them are lost in the subscriber, the parities held by the subscriber are expressed by following equation (8).

$$P_{2,i}=f_i(x)\%(x-a^{l+1})=f_i(a^{l+1})$$

$$P_{5,i}=f_i(x)\%(x-a^{l+4})=f_i(a^{l+4}) \quad (8)$$

Therefore, a simultaneous equation involving following equations (9) and (10) is solved for recovering the lost e-th and f-th data units Ue and Uf. Meanwhile, for simplifying the description, suppose that $a^{255}=1$ and $l=0$.

$$f_i(a^1)-g_i(a^1)=E_i(a^1)^{128-e}+F_i(a^1)^{128-f} \quad (9)$$

$$f_i(a^4)-g_i(a^4)=E_i(a^4)^{128-e}+F_i(a^4)^{128-f} \quad (10)$$

When dividing equation (10) by $a^{3(64-e)}$ when solving the simultaneous equation, following equation (11) is obtained.

$$f_i(a^4)-g_i(a^4)/a^{3(128-e)}=E_i(a^4)^{128-e}+F_i(a^{4(128-f)-3(28-e)}) \quad (11)$$

Although $a^{(4f-3e)}=a^f$, that is to say, $a^{3e}=a^{3f}$ might be satisfied in equation (11), in this case, a coefficient of equation (10) is the same as the coefficient of equation (9) and they are in linear dependent relationship, so that the simultaneous equation involving equations (9) and (10) cannot be solved. As a result, the lost unit cannot be recovered.

For the above-described reason, it becomes possible to avoid a situation in which the lost unit cannot be recovered by using the continuous parities linearly independent from each other as a plurality of parities used for recovering a plurality of lost units.

Subsequently, an operational example in which continuity of the parities is secured in the subscriber is described with reference to FIG. 6. Meanwhile, in the description with reference to FIG. 6, suppose that only the subscriber R3 illustrated in FIG. 4 or 5 belongs to the destination multicast group for simplification.

Figure 6:
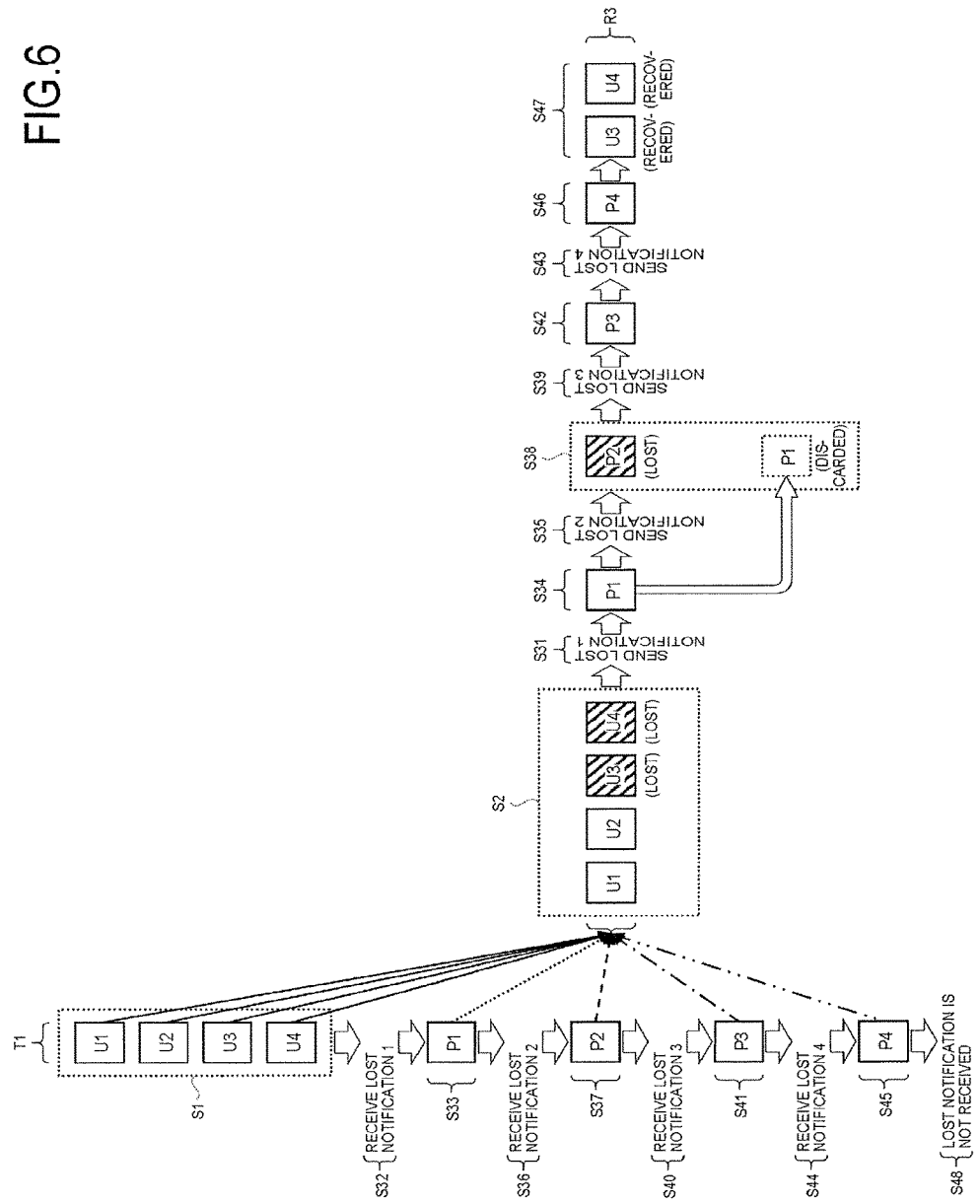
FIG. 6 is a schematic diagram for illustrating an operational example when continuity of parities is secured in the embodiment.

As illustrated in FIG. 6, when the two data units U3 and U4 are lost in the subscriber R3 (step S2) as a result of the multicast-delivery of the data units U1 to U4 from the publisher T1 (step S1), the subscriber R3 first sends the first lost notification 1 to the publisher T1 (step S31). The publisher T1 which receives the lost notification 1 (step S32) creates the first parity unit P1 and multicast-delivers the same to the destination multicast group (step S33). In response to this, the subscriber R3 checks whether the received parity unit P1 is lost, and when this is not lost, this stores the parity unit P1 (or the parity obtained from the parity unit P1) in a certain memory (step S34). According to this, a remaining number of parities required for recovering the lost unit in the subscriber R3 decreases from two to one.

Subsequently, the subscriber R3 sends the second lost notification 2 to the publisher T1 (step S35). The publisher T1 which receives the lost notification 2 (step S36) creates the second parity unit P2 and multicast-delivers the same to the destination multicast group (step S37). In response to this, the subscriber R3 checks whether the received parity unit P2 is lost. When the parity unit P2 is lost as a result of checking, the subscriber R3 discards the lost parity unit P2 and discards all the parity units (or the parities obtained from the parity units) stored in a certain memory (step S38). In this example, the parity unit P1 (or the parity obtained from the parity unit P1) is stored in the memory, so that the subscriber R3 discards the stored parity unit P1 (or the parity obtained from the parity unit P1). As a result, the remaining number of parities required for recovering the lost unit in the subscriber R3 becomes its original number two, that is to say, the number of lost units in the subscriber R3.

Then, the subscriber R3 sends the third lost notification 3 to the publisher T1 (step S39). The publisher T1 which receives the lost notification 3 (step S40) creates the third parity unit P3 and multicast-delivers the same to the destination multicast group (step S41). In response to this, the subscriber R3 checks whether the received parity unit P3 is lost, and when this is not lost, this stores the parity unit P3 (or the parity obtained from the parity unit P3) in a certain memory (step S42). Hereinafter, the lost notification is sent from the subscriber R3 to the publisher T1, the parity unit is multicast-delivered from the publisher T1 to the destination multicast group, and the stored parity unit (or the parity obtained from the parity unit) is discarded if necessary in a repeated manner until the required number of continuous parities are secured (steps S43 to S46), then the required number of continuous parity units (or the parities obtained from the parity units) for the subscriber R3, that is to say, the parity units as many as the lost units are secured.

When securing the required number of parity units P3 and P4 (or the parities obtained from the parity units P3 and P4) in this manner, the subscriber R3 recovers the data units U3 and U4 being the lost units by using the parities obtained from the parity units P3 and P4 (step S47). Thereafter, since the lost notification is not sent from the subscriber R3 to the publisher T1 (step S48), the publisher T1 determines that all the data to be sent are received by the subscriber R3 and finishes this operation.

Figure 7:
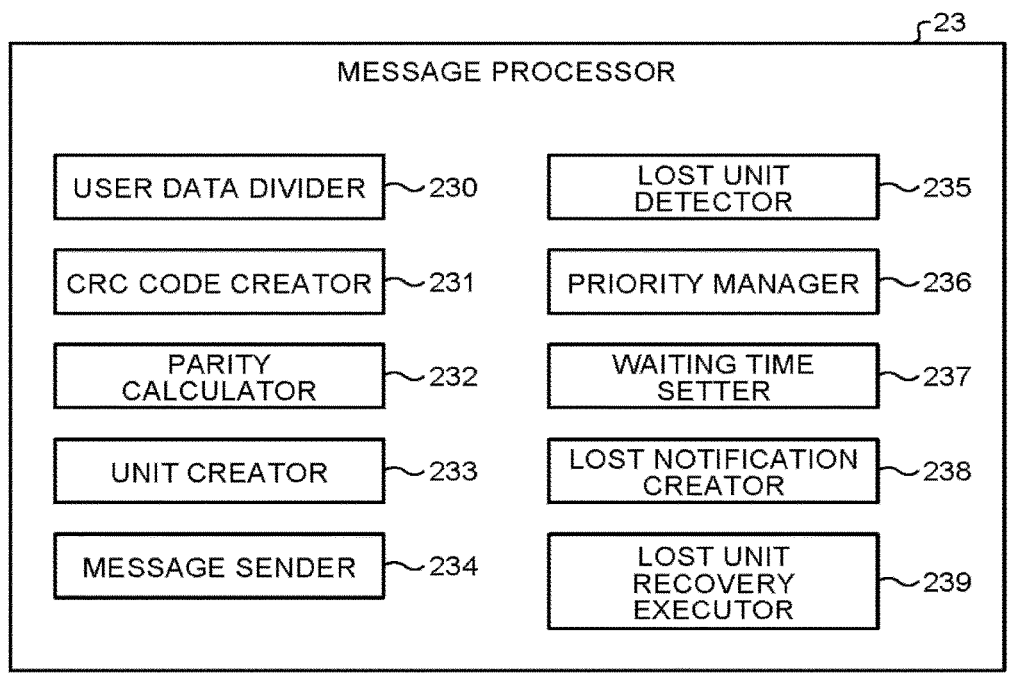
FIG. 7 is a view illustrating a more detailed block configuration example of a message processor according to the embodiment.

Creation of the data unit and the parity unit described with reference to FIG. 3 and operation of detecting and recovering the lost unit described with reference to FIGS. 4 to 6 may also be executed by the message processor 23 in the communication device 1 illustrated in FIG. 1, for example. FIG. 7 illustrates a more detailed block configuration example of the message processor 23 according to the embodiment.

As illustrated in FIG. 7, the message processor 23 according to the embodiment includes a user data divider 230, a CRC code creator (error-detecting code creator) 231, a parity calculator 232, a unit creator 233, a message sender 234, a lost unit detector 235, a priority manager 236, a waiting time setter 237, a lost notification creator 238, and a lost unit recovery executor 239. In this configuration, the user data divider 230, the CRC code creator 231, the parity calculator 232, the unit creator 233, and the message sender 234 are configurations necessary when operating as the publisher, and the message sender 234, the lost unit detector 235, the priority manager 236, the waiting time setter 237, the lost notification creator 238, and the lost unit recovery executor 239 are configurations necessary when operating as the subscriber.

The user data divider 230 divides the data to be sent stored in the non-volatile memory 5, for example, into the 1 kB user data.

The CRC code creator 231 calculates the CRC code for each of the user data divided into the 1 kB user data, for example. The CRC code creator 231 calculates the CRC code for the 1 kB parity calculated by the parity calculator 232 to be described later. Meanwhile, although the CRC code is illustrated as the error-detecting code for detecting the loss of the data unit and the parity unit in this description, there is no limitation; various error-detecting codes may also be used.

The parity calculator 232 calculates the 1 kB parity, for example, by the above-described method.

The unit creator 233 creates the data units U1 to Uz illustrated in FIG. 3, for example, by concatenating the user data divided by 1 kB, for example, by the user data divider 230 with the CRC codes calculated for respective user data by the CRC code creator 231. The unit creator 233 sequentially creates the required number of parity units P1, P2, and so on by concatenating the parities calculated by the parity calculator 232 with the CRC codes calculated by the CRC code creator 231 for respective parities. Meanwhile, the required number is the number corresponding to the number of lost notifications received from the subscriber.

The message sender 234 converts the data unit and the parity unit created by the unit creator 233 to a message format being the format delivered by multicast and multicast-delivers the message created by this through the wireless interface 4. The message sender 234 converts the lost notification created by the lost notification creator 238 to be described later to the message format and sends the lost notification message created by this to the publisher through the wireless interface 4.

The lost unit detector 235 detects whether the received data unit is the lost unit by using the CRC code included in each data unit received from the publisher and/or the unit number.

In the communication device 1 operating as the publisher, for example, the priority manager 236 sets the priority for each subscriber based on the index measured by the communication quality indicator 24 in each communication device 1 forming the mesh network and shares the same among the communication devices 1 forming the mesh network. The priority manager 236 in the communication device 1 operating as the subscriber sets the priority of the device itself from the priority sent from the communication device 1 operating as the publisher.

The waiting time setter 237 sets waiting time (also referred to as back off time) for the sending of the lost notification when there is the lost unit in the device itself based on the priority of the device itself set by the priority manager 236. Relationship between the priority and waiting time t may be managed by a memory not illustrated and the like, for example, or may be calculated each time based on the priority of the device itself. At that time, longer waiting time t is set as the priority is lower. For example, the waiting time t for each subscriber may be set under a rule that the waiting time t becomes longer by certain time as the priority lowers by one. However, the longest waiting time t should be shorter than time for which the publisher waits for the lost notification (waiting time T).

The lost notification creator 238 creates the lost notification indicating that there is the lost unit when the lost unit detector 235 detects that there is the lost unit.

The lost unit recovery executor 239 obtains the parity from the parity unit received from the publisher and executes the process of recovering the lost unit by using the obtained parity when there is the lost unit in the device itself.

Figure 8:
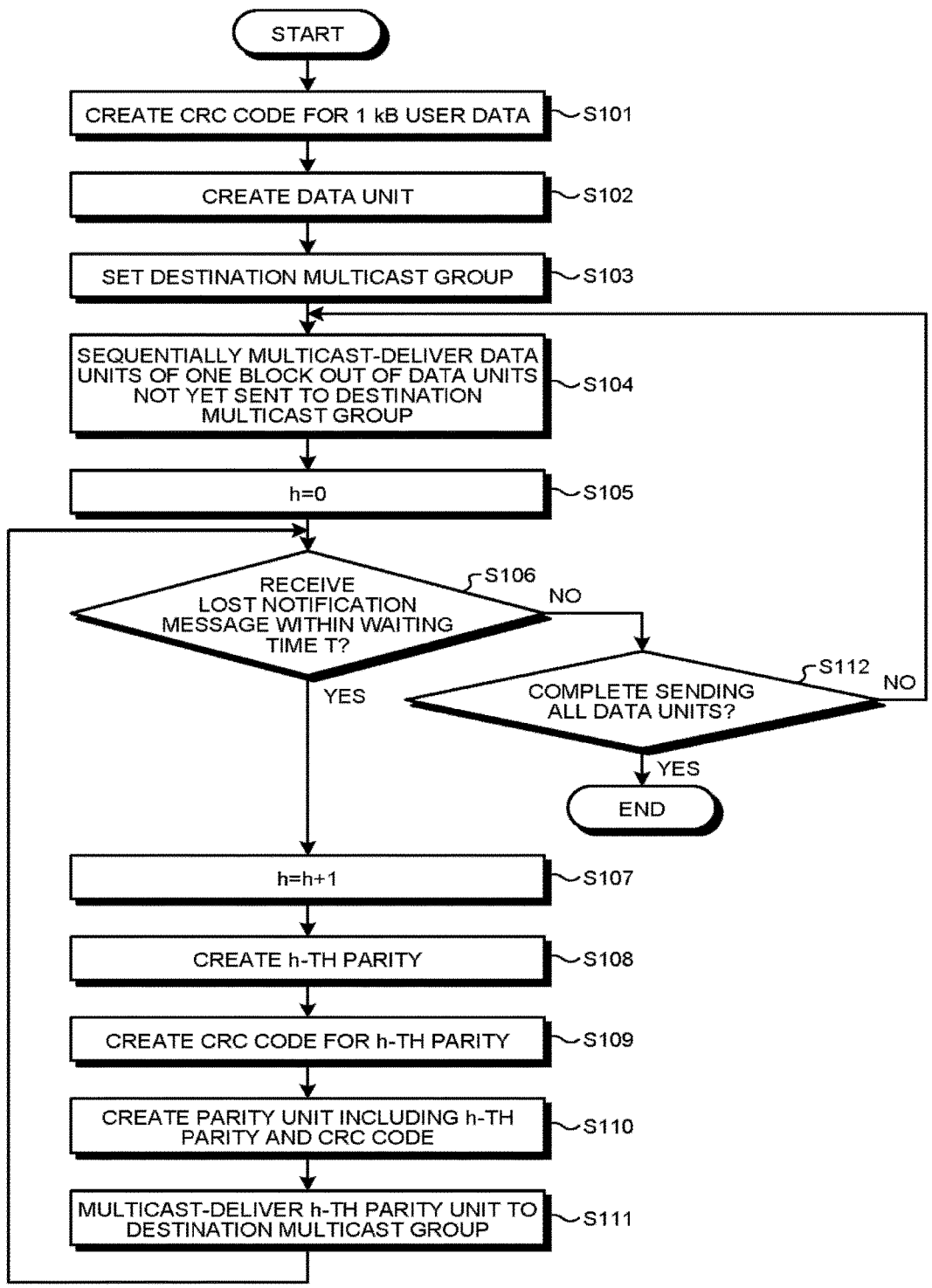
FIG. 8 is a flowchart illustrating a schematic operational example of the communication device operating as the publisher in the embodiment.
Figure 9:
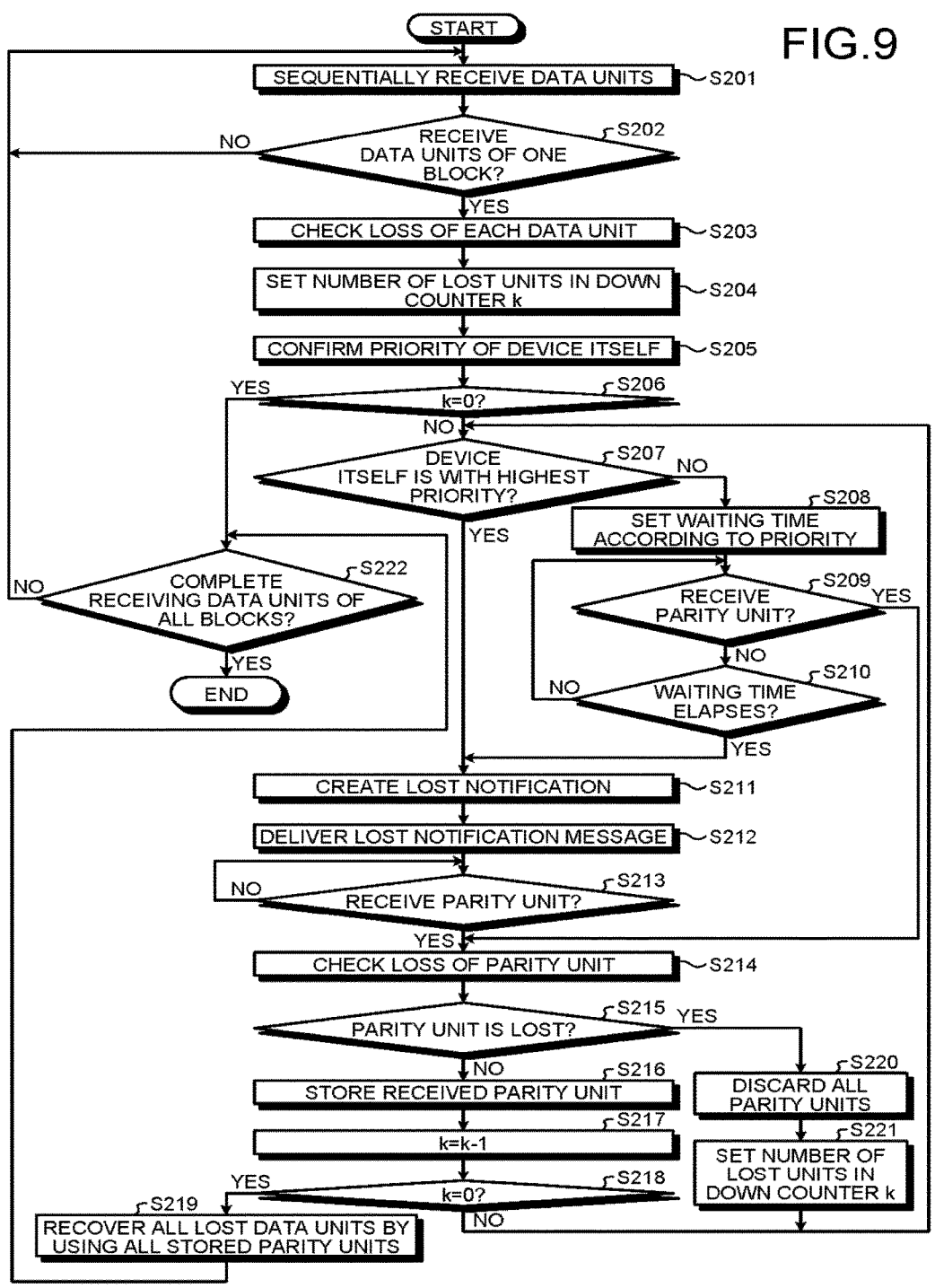
FIG. 9 is a flowchart illustrating a schematic operational example of the communication device operating as the subscriber in the embodiment.

Subsequently, an operational example of the communication device 1 according to the embodiment is described in detail with reference to flowcharts illustrated in FIGS. 8 and 9 with reference to the schematic configuration examples of the communication device 1 illustrated in FIGS. 1 and 7. FIG. 8 is the flowchart illustrating a schematic operational example of the communication device 1 operating as the publisher. FIG. 9 is the flowchart illustrating the schematic operational example of the communication device 1 operating as the subscriber. Meanwhile, the operational example using the system illustrated in FIG. 6 is illustrated in FIG. 9.

First, as illustrated in FIG. 8, in the communication device 1 operating as the publisher, the CRC code creator 231 of the message processor 23 creates the CRC code for each of the user data divided by 1 kB by the user data divider 230 (step S101). Subsequently, the unit creator 233 creates the data units U1 to Uz by concatenating the 1 kB user data with the CRC code of each of them (step S102).

Subsequently, the operation mode setter 21 sets the destination multicast group (step S103). Next, the message sender 234 of the message processor 23 converts the data units of one block (that is to say, 64 data units) out of the data units not yet sent to the message format and sequentially multicast-delivers the messages created by this to the set destination multicast group through the wireless interface 4 (step S104).

Next, the message processor 23 resets a value h of an up counter not illustrated (h=0) (step S105), then waits for the reception of a lost notification message from the subscriber for certain waiting time T (step S106).

When receiving the lost notification message from the subscriber within the waiting time T (step S106; YES), the message processor 23 increments the value h of the up counter by one (step S107). Subsequently, the parity calculator 232 of the message processor 23 creates h-th parity (step S108) and the CRC code creator 231 creates the CRC code for the h-th parity (step S109). Subsequently, the unit creator 233 creates a h-th parity unit by using the h-th parity and the CRC code thereof (step S110). Thereafter, the message sender 234 converts the created h-th parity unit to the message format and multicast-delivers the message created by this to the destination multicast group through the wireless interface 4 (step S111), then returns to step S106.

When the lost notification message is not received from the subscriber within the waiting time T (step S106; NO), the network controller 2 determines whether the sending of all the data units is completed (step S112), and when this is completed (step S112; YES), this finishes this operation. On the other hand, when this is not completed (step S112; NO), the network controller 2 returns to step S104 and repeats subsequent operation until the sending of all the data units is completed.

In contrast, as illustrated in FIG. 9, in the communication device 1 operating as the subscriber, the network controller 2 sequentially receives the data units of one block multicast-delivered from the publisher through the wireless interface 4 (steps S201 to 202; NO). When the reception of the data units of one block is completed (step S202; YES), the lost unit detector 235 of the message processor 23 checks the loss of each of the received data units of one block by using the CRC code included in each data unit and/or the unit number of each data unit (step S203) and a counter value k of a down counter not illustrated is set to the number of checked lost units (step S204). At that time, when there is no lost unit, the counter value k of the down counter is set to 0.

Next, the priority manager 236 of the message processor 23 confirms the priority of the device itself in the destination multicast group (step S205), then the message processor 23 determines whether the counter value k of the down counter is 0 (step S206). When the counter value k is 0 (step S206; YES), that is to say, when there is no lost unit, the file manager 22 determines whether the reception of the data units of all the blocks is completed (step S222). When the reception of the data units of all the blocks is completed (step S222; YES), the network controller 2 finishes this operation. On the other hand, when the reception is not completed (step S222; NO), the network controller 2 returns to step S201 and executes subsequent operation.

As a result of the determination at step S206, when the counter value k is not 0 (step S206; NO), that is to say, when there is the lost unit, the network controller 2 shifts to step S208 if the priority of the device itself confirmed at step S205 is not the highest (step S207; NO). On the other hand, when the priority of the device itself is the highest (step S207; YES), the network controller 2 shifts to step S211.

At step S208, the waiting time setter 237 of the message processor 23 sets the waiting time t according to the confirmed priority of the device itself (step S208). Subsequently, the network controller 2 determines whether the parity unit is received from the publisher through the wireless interface 4 during the waiting time t (step S209; NO to step S210; NO) (step S209). When the parity unit is received during the waiting time t (step S209; YES), the network controller 2 shifts to step S214. On the other hand, when the parity unit is not received during the waiting time t (step S209; NO to step S210; YES), the network controller 2 shifts to step S211.

At step S211, the lost notification creator 238 of the message processor 23 creates the lost notification for notifying that the data unit is lost. Subsequently, the message sender 234 converts the created lost notification to the message format and sends the lost notification message created by this to the publisher T1 through the wireless interface 4 (step S212). Thereafter, the network controller 2 waits for the multicast-delivery of the parity unit from the publisher T1 (step S213; NO), and when receiving the parity unit (step S213; YES), this shifts to step S214.

At step S214, the lost unit detector 235 of the message processor 23 checks whether the received parity unit is lost by using the CRC code included in the parity unit (step S214).

As a result of the check at step S214, when the parity unit is lost (step S215; YES), the message processor 23 discards all the parity units including the received parity unit and the parity unit stored in the memory (or the parity obtained from the parity unit) (step S220). Subsequently, the lost unit detector 235 of the message processor 23 resets the counter value k of the down counter to the number of lost units confirmed at step S203 again (step S221). Thereafter, the network controller 2 returns to step S207 and executes subsequent operation.

On the other hand, as a result of the check at step S214, when the parity unit is not lost (step S215; NO), the lost unit detector 235 of the message processor 23 stores the received parity unit (or the parity obtained from the parity unit) in the memory not illustrated (step S216) and decrements the counter value k of the down counter by one (step S217).

Subsequently, the network controller 2 determines whether the counter value k of the down counter is 0 (step S218). When the counter value k is not 0 (step S218; NO), the network controller 2 returns to step S207 and executes the subsequent operation. On the other hand, when the counter value k is 0 (step S218; YES), the lost unit recovery executor 239 of the message processor 23 reads the parity unit (or the parity obtained from the parity unit) stored in the memory, that is to say, the parity units (or the parities obtained from the parity units) as many as the lost units from the memory and executes the process of recovering all the lost units by using all the read parity units (or the parities obtained from the parity units) (step S219). Thereafter, the network controller 2 shifts to step S222 and repeats the subsequent operation until the process for the data units of all the blocks is completed.

By including the above-described configuration and operation, according to the embodiment, the parity which may be commonly used for any lost unit is created, so that it becomes possible to make the number of parities which the communication device 1 operating as the publisher should create the number requested by the subscriber in which the number of lost units is the largest. As a result, it becomes possible to decrease the load on the publisher. It also becomes possible to decrease the data amount sent from the publisher to the subscriber and the data amount which should be processed by the subscriber for the similar reason. As a result, it becomes possible to decrease the load on the subscriber and the network.

Meanwhile, although a case in which the publisher creates one parity unit to deliver for one lost notification sent from the subscriber is illustrated in the above-described embodiment, there is no limitation. For example, it is also possible to configure such that the publisher creates two or more parity units to deliver for one lost notification sent from the subscriber. In this case, it becomes possible to reduce total waiting time on the subscriber side in a situation in which a plurality of parities is requested, so that it becomes possible to reduce substantial delivery time of the data to be sent.

It is also possible to configure such that the number of lost units in each subscriber, that is to say, the number of parity units requested by each subscriber is included in the lost notification sent from the subscriber to the publisher. In this case, the waiting time t when each subscriber sends the lost notification may be set not according to the priority based on the index measured by the communication quality indicator 24 but according to the number of lost units generated in each subscriber.

When setting the waiting time t according to the number of lost units, it is possible to set the waiting time t of each subscriber by a random number an average value of which is $C \times (K-E)+L$ in which the number of lost units is E, and K, L, and C are constants. By setting the waiting time t of each subscriber in this manner, it is configured such that the subscriber having the largest number of lost units sends the lost notification with the highest priority, so that it becomes possible to further decrease the data amount sent/received between the publisher and the subscriber and further reduce the total waiting time on the subscriber side.

Although it is configured such that all the lost units are recovered in all the subscribers regardless of the number of generated lost units in the above-described embodiment, there is no limitation. For example, it is possible to configure such that the subscriber in which the lost units more than those determined in advance are generated voluntarily exits from the destination of the data to be sent (that is to say, the destination multicast group) by determination by the device itself. Such a configuration makes it possible to exclude a case in which the substantial delivery time of the data to be sent becomes significantly long. Meanwhile, the network controller 2 in the communication device 1 operating as the subscriber may determine to execute such voluntary exit based on the number of lost units detected by the lost unit detector 235, for example.

It is possible to exclude the case in which the substantial delivery time of the data to be sent becomes significantly long also by setting an upper limit value of the number of parity units created by the publisher for one block in advance.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A communication device comprising:
   a communication interface that sends/receives data to/from another communication device;
   a unit creator that creates a plurality of data units, each of the plurality of data units including user data of a certain size;
   a sender that sends the plurality of data units to the other communication device through the communication interface; and
   a parity calculator that calculates parity which is capable of being commonly used for a plurality data units out of the plurality of data units, wherein
   the sender sends the plurality of data units to the other communication device through the communication interface,
   the parity calculator calculates the parity of the certain size based on the data to be sent every time receiving a lost notification from the other communication device, the lost notification indicating that one or more data units out of the plurality of data units are lost,
   the unit creator creates a parity unit including the parity calculated by the parity calculator, and
   the sender sends the parity unit to the other communication device through the communication interface.

2. The communication device according to claim 1, wherein the parity calculator calculates h-th parity by using following equation $$P_{h,i} = f_i(x)\%(x-a^{l+h-1}) = f_i(a^{l+h-1})$$

wherein i is an integer taking a value from one up to the number of unit data forming the user data included in respective data units, % is modulo operation, h is an integer not smaller than one, x is one element of a Galois field of $\{0, a^0, a^1, a^2, \ldots, a^{m-2}\}$ in which a is an element, wherein $m=2^l$ and $a^{m-1}=1$.

3. The communication device according to claim 1, further comprising: an error-detecting code creator that calculates error-detecting codes of the plurality of data units and an error-detecting code of the parity, wherein
   the unit creator creates the plurality of data units by concatenating the user data with the error-detecting codes calculated by the error-detecting code creator for the user data and creates the parity unit by concatenating the parity with the error-detecting code calculated by the error-detecting code creator for the parity.

4. The communication device according to claim 1, wherein, the parity calculator waits for reception of the lost notification from the other communication device for certain waiting time when a certain number of the data units or the parity unit are sent to the other communication device through the communication interface, and calculates the parity by using the certain number of user data out of the data to be sent when receiving the lost notification within the certain waiting time.

5. The communication device according to claim 4, wherein the certain number is $((2^n-1)+1)/2=2^{(n-1)}$ (n is an integer not smaller than one; $2^n-1$ is a Mersenne prime).

6. The communication device according to claim 1, wherein
   the sender converts the plurality of data units and the parity unit to a message format, and
   the communication interface multicast-delivers the data units and the parity unit converted to the message format to the other communication device.

7. A communication device comprising:
   a communication interface that sends/receives data to/from another device;
   a lost unit detector that detects loss of every one of a plurality of data units received from the other communication device through the communication interface, each of the plurality of data units including user data of a certain size;
   a lost notification creator that creates, when the lost unit detector detects the loss of one or more data units out of the plurality of data units, a lost notification indicating that one or more data units are lost;
   a sender that sends the lost notification created by the lost notification creator to the other communication device through the communication interface; and
   a lost unit recovery executor that recovers the one or more lost data units detected by the lost unit detector by using parity included in a parity unit which the other communication device has sent in response to the lost notification.

8. The communication device according to claim 7, wherein the lost unit detector detects the loss of every one of the plurality of data units by using error-detecting codes included in the plurality of data units and sequence numbers, each of the sequence numbers being assigned to each of the plurality of data units.

9. The communication device according to claim 7, wherein
   the parity unit includes an error-detecting code, and
   the lost unit detector detects whether the parity unit is lost by using the error-detecting code included in the parity unit.

10. The communication device according to claim 7, wherein,
    when receiving a certain number of the data units, the lost notification creator creates the lost notification when there is the one or more lost data units in the certain number of data units, and
    the lost unit recovery executor recovers the one or more lost data units by using the certain number of data units and the parity.

11. The communication device according to claim 10, wherein
    the lost notification creator creates the lost notification until parities as many as the one or more lost data units detected by the lost unit detector are received, and the lost unit recovery executor recovers the one or more lost data units by using the certain number of data units and the parities when the parities as many as the one or more lost data units are secured.

12. The communication device according to claim 11, wherein the lost notification creator creates the lost notification until the parities as many as the one or more lost data units detected by the lost unit detector, the parities linearly independent from one another are secured.

13. The communication device according to claim 12, wherein the parities linearly independent from one another include h continuous parities out of the parities calculated by using following equation $$P_{h,i}=f_i(x)/\%(x-a^{l+h-1})=f_i(a^{l+h-1})$$

wherein i is an integer taking a value from one up to the number of unit data forming the user data included in respective data units, % is modulo operation, h is an integer not smaller than one, x is one element of a Galois field of $\{0, a^0, a^1, a^2, \ldots, a^{m-2}\}$ in which a is an element, wherein $m=2^j$ and $a^{m-1}=1$.

14. The communication device according to claim 12, wherein the certain number is $((2^n-1)+1)/2=2^{(n-1)}$ (n is an integer not smaller than one; $2^n-1$ is a Mersenne prime).

15. The communication device according to claim 7, wherein the communication interface receives the plurality of data units and the parity unit multicast-delivered from the other communication device in a message format.

16. The communication device according to claim 15, further comprising:
  a priority manager that sets priority of the device itself in a destination multicast group being a destination of the multicast-delivery; and
  a waiting time setter that sets waiting time according to the priority of the device itself set by the priority manager, wherein
  the lost notification creator creates the lost notification after the waiting time elapses when the lost unit detector detects the loss of the one or more data units out of the plurality of data units and creates the lost notification after the waiting time elapses from the reception of the parity unit when the parity unit is received from the other communication device before the waiting time elapses and when it is required to receive a next parity unit from the other communication device.

17. The communication device according to claim 15, further comprising: a waiting time setter that sets waiting time according to the number of the one or more lost data units detected by the lost unit detector, wherein
  the lost notification creator creates the lost notification after the waiting time elapses when the lost unit detector detects the loss of the one or more data units out of the plurality of data units and creates the lost notification after the waiting time elapses from the reception of the parity unit when the parity unit is received from the other communication device before the waiting time elapses and when it is required to receive a next parity unit from the other communication device.

18. The communication device according to claim 15 that voluntarily exits from the destination multicast group when the number of the one or more lost data units detected by the lost unit detector is not smaller than a certain number determined in advance.

19. A communication system comprising a publisher and a subscriber,
  the publisher including
    a first communication interface that sends/receives data to/from a subscriber,
    a unit creator that creates a plurality of data units, each of the plurality of data units including user data of a certain size,
    a first sender that sends the plurality of data units to the subscriber through the first communication interface, and
    a parity calculator that calculates parity which is capable of being commonly used for different data units out of the plurality of data units,
    the first sender sending the plurality of data units to the subscriber through the first communication interface,
    the parity calculator calculating the parity of the certain size based on the data to be sent every time receiving a lost notification from the subscriber, the lost notification indicating that one or more data units out of the plurality of data units are lost,
    the unit creator creating a parity unit including the parity calculated by the parity calculator, and
    the first sender sending the parity unit to the subscriber through the first communication interface, and
  the subscriber including
    a second communication interface that sends/receives the data to/from the publisher,
    a lost unit detector that detects loss of every one of the plurality of data units received from the publisher through the second communication interface,
    a lost notification creator that creates the lost notification indicating that the one or more data units are lost when the lost unit detector detects the loss of the one or more data units out of the plurality of data units,
    a second sender that sends the lost notification created by the lost notification creator to the publisher through the second communication interface, and
    a lost unit recovery executor that recovers the one or more lost data units detected by the lost unit detector by using the parity included in the parity unit received from the publisher according to the lost notification.

* * * * *